United States Patent [19]
Smith et al.

[11] Patent Number: 5,809,126
[45] Date of Patent: Sep. 15, 1998

[54] TELEPHONE BAR DEVICE

[75] Inventors: Eric Timothy Smith; Lance Tye De La Haye; Michael William Aitken, all of Auckland, New Zealand

[73] Assignee: Maldes Phoenix Limited, Auckland, New Zealand

[21] Appl. No.: 600,997

[22] PCT Filed: Oct. 26, 1994

[86] PCT No.: PCT/NZ94/00119

§ 371 Date: Mar. 5, 1996

§ 102(e) Date: Mar. 5, 1996

[87] PCT Pub. No.: WO95/12266

PCT Pub. Date: May 4, 1995

[30] Foreign Application Priority Data

Oct. 28, 1993 [NZ] New Zealand ............................ 250093

[51] Int. Cl.[6] .............................. H04M 1/66; G06F 7/04; G07D 7/00

[52] U.S. Cl. ............... 379/200; 340/825.31; 340/825.34; 379/197; 379/198; 379/199

[58] Field of Search .................................... 379/188, 189, 379/200, 192, 161, 168, 196, 197, 198; 340/825.3, 825.31, 825.32, 825.34

[56] References Cited

U.S. PATENT DOCUMENTS

| | | | |
|---|---|---|---|
| 4,099,033 | 7/1978 | Murray | 379/188 |
| 4,314,108 | 2/1982 | Sharvit | 379/188 |
| 4,355,208 | 10/1982 | Cribb et al. | 379/188 |
| 4,612,419 | 9/1986 | Smith | 379/200 |
| 4,759,056 | 7/1988 | Akiyama | 379/197 |
| 4,833,707 | 5/1989 | Serret, Jr. | 379/200 |
| 4,953,202 | 8/1990 | Newell | 379/188 |
| 5,200,995 | 4/1993 | Gaukel et al. | 379/200 |
| 5,274,698 | 12/1993 | Jang | 379/198 |
| 5,351,289 | 9/1994 | Logsdon et al. | 379/199 X |

FOREIGN PATENT DOCUMENTS

| | | |
|---|---|---|
| 16581/88 | 12/1988 | Australia . |
| 44203/93 | 2/1994 | Australia . |
| 2 086 187 | 5/1982 | United Kingdom . |
| 2 211 695 | 7/1989 | United Kingdom . |
| 2 227 906 | 8/1990 | United Kingdom . |
| 2 253 542 | 9/1992 | United Kingdom . |
| WO 85/00716 | 2/1985 | WIPO . |
| WO 87/07800 | 12/1987 | WIPO . |

*Primary Examiner*—Harry S. Hong
*Attorney, Agent, or Firm*—Young & Thompson

[57] ABSTRACT

A stand-alone toll-barring device powered by the telephone line voltage or from an external supply. The device recognizes a user's personal identification number (PIN) as it is dialed in from a telephone or similar peripheral device, and has device to recall rights (if any) corresponding to that PIN from a memory table, and a device to assess whether a number being dial just after entry of the PIN is permitted under those rights. Emergency numbers and incoming calls are not barred. If the number is not permitted, the call is immediately interrupted. Reprogramming of the data is provided by a further PIN. The device may be installed within a telephone or across fixed telecommunications wiring installations within a building. Should a larger range of permitted or denied numbers be required, multiple devices can be used in series.

13 Claims, 4 Drawing Sheets

TELEPHONE BAR DEVICE

FIELD OF THE INVENTION

This invention relates to telecommunications devices and more particularly to telephones, and in particular to a line access controller which is analogous to one known in a more limited and specific form as a toll-barring device—being means to decide whether to allow or deny access to telephone services from a telephone or like peripheral, based on recognition of a password and recognition of dialling prefixes.

BACKGROUND

It is possible for a person operating a telephone to dial to any of over 500 million telephones in the world, but most of these connections will automatically result in large charges being made. Especially in the case of a telephone which members of the public can use, there is a need to be able to limit the people capable of making expense-incurring connections to those authorised.

While it is known that computerised telephone exchanges of the type known as PABX (Private Automatic Branch Exchange) can be arranged using programming of the controller so as to prevent long-distance telephone or toll calls being made from at least one identified extension, and while it is also common for the telephone server company (eg, Telecom NZ Ltd) to offer a toll bar or line access control as a chargeable service to residences, but implemented at the exchange, these methods are relatively inflexible. The allowed/denied range of calls is fixed for each telephone set, or each trunk line, respectively, unless reprogramming is carried out, and this cannot be bypassed for occasional exceptional calls.

Abuse of a telephone account is relatively more likely to occur where teenage children abound and chargeable services (0900 numbers in New Zealand; other combinations elsewhere) are widely advertised, in sports clubs where a publicly available telephone particularly for emergency use is desirable, or in establishments such as businesses.

Making sales by telephone, as where credit cards are used to pay for a sale over a telephone, may need to be controlled by some means. Commonly the distant number is an 0800 number.

The problem is compounded by an ever-growing list of numbers or number prefixes involving perhaps avoidable cost, by a different set for each supplier of long-distance telephone lines, and by a growing-number of telephone services offered for sale.

There are a number of compelling reasons for providing means to allow different individuals sharing telephone facilities to have greater or lesser powers to make chargeable telephone calls, or to restrict calling from a telephone to just a limited set of permitted numbers.

DEFINITION OF TERMS

DTMF or Dual-tone multi-frequency code—a standard set of tones wherein two tones selected from a defined set are broadcast simultaneously, as for dialling pulses, used in telephone circuits. This specification is oriented around "decadic dialling" in which a limited range of codes (the decade 0–9) are used in a sequence to select a destination number. Other codes, such as the "*" and the "#" codes are generally used for special functions.

PABX or Private automatic branch exchange—a subsidiary exchange as used in an office wherein a number of telephone users may call each other through the PABX or call outside through trunk lines to a conventional exchange.

Access Code—A single digit, usually zero, under NZ Telecom usage.

Area Code—the one or more digits following the access code. Under NZ Telecom usage:

0=international
1=exchange services,
2.7=various regions of New Zealand
8=toll-free national call (the 0800 numbers)
9=charged call (the 0900 numbers)

An alternative service provider in New Zealand, "Clear Communications" has different prefixes for corresponding services.

PIN Number or PIN Personal Identification Number. A kind of password; in this document it is one entered from a telephone keypad in order to be allowed access to certain privileges not provided for in the default state.

Telephone. A unit of equipment having means to select a number to be called such as a keypad or dial, means to make speech communication, such as a handset, and ancillary equipment such as bells, dialling memory, etc.

Terminal unit An analogous unit to the above but instead of a primarily speech-capable unit being a facsimile machine, computer modem, (which may be an internal card in a computer) or the like.

Exchange The telephone service provider's means for making contact between a caller and a called telephone or terminal unit.

On-hook An operational state of a telephone or terminal unit in which no significant current is drawn and the exchange immediately assumes as a consequence that the telephone is not in use. Originates from the idea of a handset being hung up on a hook when not in use.

A series of dialling signals comprises a series of individual Touch-Tone (R) or pulse dialling sequences, each of which corresponds to a single character on the keypad or dial of the telephone.

Note that in this specification reference to numbers such as the 0800 or 0900 prefix numbers reflects the allocation made by the New Zealand telecommunications authorities and in other countries these series may have differing prefixes.

OBJECT

It is an object of this invention to provide a means for controlling access by members of the public to predetermined telephone service prefixes by a process of recognition of one of a range of current PINs, on-line dialling prefix recognition, and matching against an internal table of permitted or denied prefixes in order to determine whether to interrupt the connection, or at least to provide the public with a useful choice.

STATEMENT OF INVENTION

In a first major aspect this invention comprises apparatus for restricting an outgoing communication initiated by an originator at a telephone or like terminal attached to a communication line, where the communication commences with a series of dialling signals, comprising means for sequentially decoding from the dialling signals a sequence of code characters containing a destination telephone number and which sequence may also contain a personal identification number or PIN, and means for assigning a hierarchical level of privilege to the outgoing communication, based on an identification of the PIN and thereby allowing the call to be completed if the destination telephone number is one permitted at that level of privilege, further including means to assign a lowest privilege rating to an outgoing communication found to lack an identifiable PIN.

In a related aspect this invention comprises apparatus for restricting an outgoing communication as described in the previous paragraph further comprising means for detecting the PIN and matching the PIN against a first stored table of PINs stored within a first data storage means, each PIN having an associated privilege rating, the first table being linked to a second table stored within a second data storage means of permitted partial or complete telephone numbers each having an associated privilege rating, and means for interrupting the communication if the privilege linked to the detected PIN does not at least equal the privilege rating linked to the partial or complete telephone numbers included in the sequence of code characters.

In another related aspect this invention comprises apparatus as described in the previous paragraph wherein the means for at least detection, storage, matching and interruption are implemented within electronics hardware.

In a further related aspect this invention comprises apparatus as described in the previous paragraph wherein the means for at least storage and matching are implemented at least partially by software.

In yet another related aspect this invention comprises apparatus as described in any previous paragraph of this section wherein means for reloading any stored tabled information is provided at the attached telephone or like terminal.

In a further related aspect this invention comprises apparatus as described in any previous paragraph of this section wherein means for reloading any stored tabled information is provided through the communications line from a remote location.

In a still further related aspect this invention comprises apparatus as described in any previous paragraph of this section wherein means for collecting and storing information concerning the originator, destination, and duration about any outgoing communications, and means for making the information available in machine-readable form is provided.

In an even further related aspect this invention comprises apparatus as described in any previous paragraph of this section wherein a telephone or like terminal contains an apparatus according to this invention.

In a second broad aspect the invention is connected across the line between the local telephone terminal and the exchange.

In a related aspect this invention comprises apparatus as described in any previous paragraph of this section wherein an installation including a plurality of telephones or like terminals merging at a common point is provided with an apparatus according to this invention installed in series with a communication line.

Alternatively it may be placed within the local telephone terminal, or alternatively it may be placed within a fixed portion of the telephone installation, preferably in a position where it cannot be bypassed.

In another related aspect a plurality of individual devices of the invention are connected together as a way of increasing the capacity of an installation to accept PINS and permitted or denied telephone numbers.

Preferably the invention does not send forward into the telephone network any valid PIN numbers it receives.

Preferably the invention receives all its control input from dial tones created within the local telephone terminal.

Preferably pulse dialling, digital, and DTMF tones are acceptable communication alternatives.

In a related aspect the invention is programmable so that the or each user's PIN, the plurality of telephone access code groups, and the allow/deny attributes associated with each access code within each group may be altered with the aid of a further master PIN.

Preferably the stored access codes are selected from the range of international, national, or local access codes/local area codes.

Alternatively the invention allows selected numbers from within a field of denied numbers or number prefixes to be accessed. For example all 0900 numbers may be blocked except the one for weather forecasts, or for example only the remote branches of an organisation may be accessed.

Preferably one grade of master PIN is capable of creating master PINS themselves able to create user PINs and corresponding groups of allow/deny tables.

Preferably another grade of master PIN is not capable of creating master PINS which are themselves able to create user PINs and corresponding groups of allow/deny tables.

Preferably at least 250 PINs can be accommodated within the non-volatile memory.

In a further related aspect the invention interrupts a telephone call in the process of being initiated by interrupting current consumption by the dependent telephone within the invention, thereby mimicking the on-hook condition.

In an alternative major aspect this invention comprises a programmable electronic circuit, inserted in the trunk line between an exchange and one or more telephones or other terminal units, installed either inside or outside the terminal unit, providing means capable of analysing a dialed sequence of codes emanating from the terminal unit as a result of a dialling action, and capable of matching at least the initial portion of said dialed sequence with at least one of an array of more than one stored PIN and in the event of a match being found, withholding the PIN sequence so that it is not transmitted and being capable of matching a further portion of said dialed sequence with at least one stored international, national, or local access code or at least one local area code and in the event of a match not being found with either the PIN itself, or the access or area code attached to the PIN, denying completion of the telephone connection in progress by emulating an on-hook state of the telephone terminal in order to terminate the connection.

In a related aspect the invention includes means to accept and store in an array one or more altered PINs and corresponding access/deny codes or attributes transmitted into it from the keypad.

In an alternative related aspect the invention includes means to accept and store one or more altered PINs and corresponding access/deny codes transmitted according to a suitable protocol from the telephone line.

In a further alternative related aspect the invention may be programmed from a computer or other device using a serial or parallel interface.

In a yet further alternative related aspect the invention may be programmed remotely down the telephone lines.

In a further related aspect the invention optionally includes means to record, store and on demand to produce information detailing the usage of valid or invalid PINs.

Optionally one or more types of call (such as to emergency services, or to local areas) may be made without use of an associated PIN and without interference by the invention.

Preferably factory settings would provide for emergency numbers to be provided in a non-erasable location so that access could not be inadvertently disrupted.

In a yet further embodiment the invention comprises a method for blocking an unpermitted telephone call from being made from a calling unit to a destination, the method for determining that the call is unpermitted being the absence of (a) a valid PIN at the start of the dialling sequence, or (b) the absence of at least part of the called number sequence from within the list of allowed number sequences for a valid PIN, and the method for blocking the call being a process of physically interrupting the flow of current in the telephone circuit to the calling unit.

PREFERRED EMBODIMENTS

The following description of the invention is given by way of example only, and is intended in no way to be limiting as to the scope of the invention.

ILLUSTRATIONS

DESCRIPTION

In principle this invention comprises a "black box", to be put in series with the line between the exchange the telephones or other telecommunications peripherals such as modems (and preferably in a site where it cannot be bypassed). The box has the function of blocking calls as they are being made from the dependent telephone to a set of specified services, such as international or national long-distance calls, to fee-incurring services such as the 0900 numbers (in the case of New Zealand Telecom) or the like. Indeed, the invention may permit no numbers at all except emergency numbers and a set of permitted numbers which might for example be the telephone numbers of other branches of a business spread out across the nation.

The existence of 0900 numbers, where services offer information or advice for a fee, can be expensive in a house where some children are relatively unbiddable in relation to use of the telephone.

The present embodiment has no significant effect upon incoming calls.

Advantages of this invention include:
(a) effective toll-barring together with flexibility of arrangements, where the invention is an improvement over schemes that confer a certain priority on a particular telephone no matter who uses it,
(b) multiple PINs which may be mapped onto a plurality of sets of allowed and/or denied numbers,
(c) a stand-alone unit which may be used in domestic circumstances and which does not require the resources of a PABX or a telephone exchange to be put into effect, although it may, in addition, be placed between a PABX and a telephone, or between a PABX and an exchange,
(d) the protected telephone always reverts to its default, protected state after each privileged call is made with the assistance of a PIN, and
(e) the invention includes the capacity to allow access to specific telephones within an area, and not just to an entire local area sharing a common code.

Figure 1:
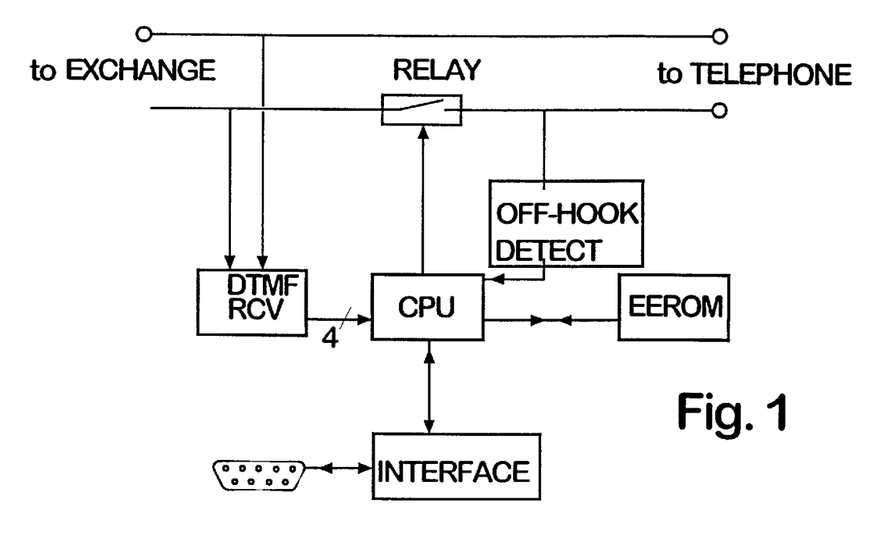
FIG. 1 shows a block diagram of the equipment.

FIG. 1 indicates the way that the apparatus is inserted within existing telephone wiring which may be inside the telephone itself adjacent to its cord or connector, along the telephone cable, or within fixed installed wiring. The relay of the device is a normally closed relay. The box called "DTMF RCV" is a device to detect and interpret dialling signals in a form that the processor (CPU) can understand; the off-hook detector is a simple voltage sensor, the EEROM is preferably a non-volatile memory, and the optional interface allows for programming or for readout of usage data. The direction of connection is not particularly important; if the device causes its normally closed switch ("Relay") to be open for a period it will not attempt to read dialling codes or signals at the same time.

Figure 2:
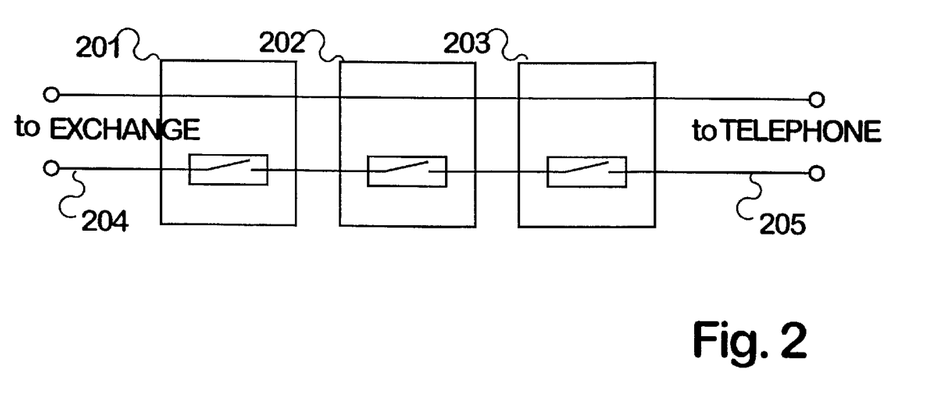
FIG. 2 shows a block diagram of the equipment in series.

FIG. 2 shows a method for placing a number of units (201, 202, 203) in line between an exchange (line 204) and a telephone (line 205) so that a greater number of allow/deny combinations can be provided than are possible with a single processor/memory combination of limited capacity. The present embodiment has a capacity of 250 PINs but only five groups or sets of allowed or permitted telephone numbers (each set comprising up to 8 individual digit combinations of from one to 15 digits) and while this is normally sufficient, series connection allows a greater capacity without designing, making, and stocking a more capable device. Although any number of these units could be used together, line current drain (nominally 10–20 mA when operating) leads to a recommendation for externally powered devices rather than line-powered devices in order to not overload the telephone line current capacity.

We prefer to place the device within the fixed telephone wiring as then it is relatively secure against tampering, although for manufacturing and a user's convenience it can be placed inside a telephone (or similar device). In the latter case an individual could plug another, unprotected telephone into the wall socket unless steps have been taken to secure the wall socket in some way. It is of course possible to interpose the unit between a PABX local exchange or the like and a central exchange so that the device can monitor a set of telephones or like terminals.

In use, the telephone (or terminal unit, if it is a fax machine, modem, or the like) will normally have a default access status in which the telephone is available for emergency calls (111 in New Zealand, 999 in Britain, etc). Any further levels of telephone access (local, national, international etc calls) will normally be restricted at some desired level although it is likely that in most installations local calls will be unrestricted. Individuals are provided with privileges in the form of individual secret passwords, conveniently PINs for these can be entered via a telephone dial or keypad. For each call that requires access beyond the default restriction level, each individual precedes the dialling sequence for the call with his or her PIN. At the end of each call the telephone reverts to its default state.

The specified services may be arranged in a hierarchy. For example any person should be able to ring the emergency services without hindrance. This is particular important in the case of a sports club where injuries may occur. There may or may not be a case for limiting access by the general public to calls made in the local free-calling zone, for even these incur charges in the case of a telephone classed as a "business" telephone. There is increasing reason to limit access to services as the charging rate increases.

On the other hand there may be legitimate reasons to allow particular people or groups of people having a certain job classification to access telephone services having a given cost structure.

Figure 5:
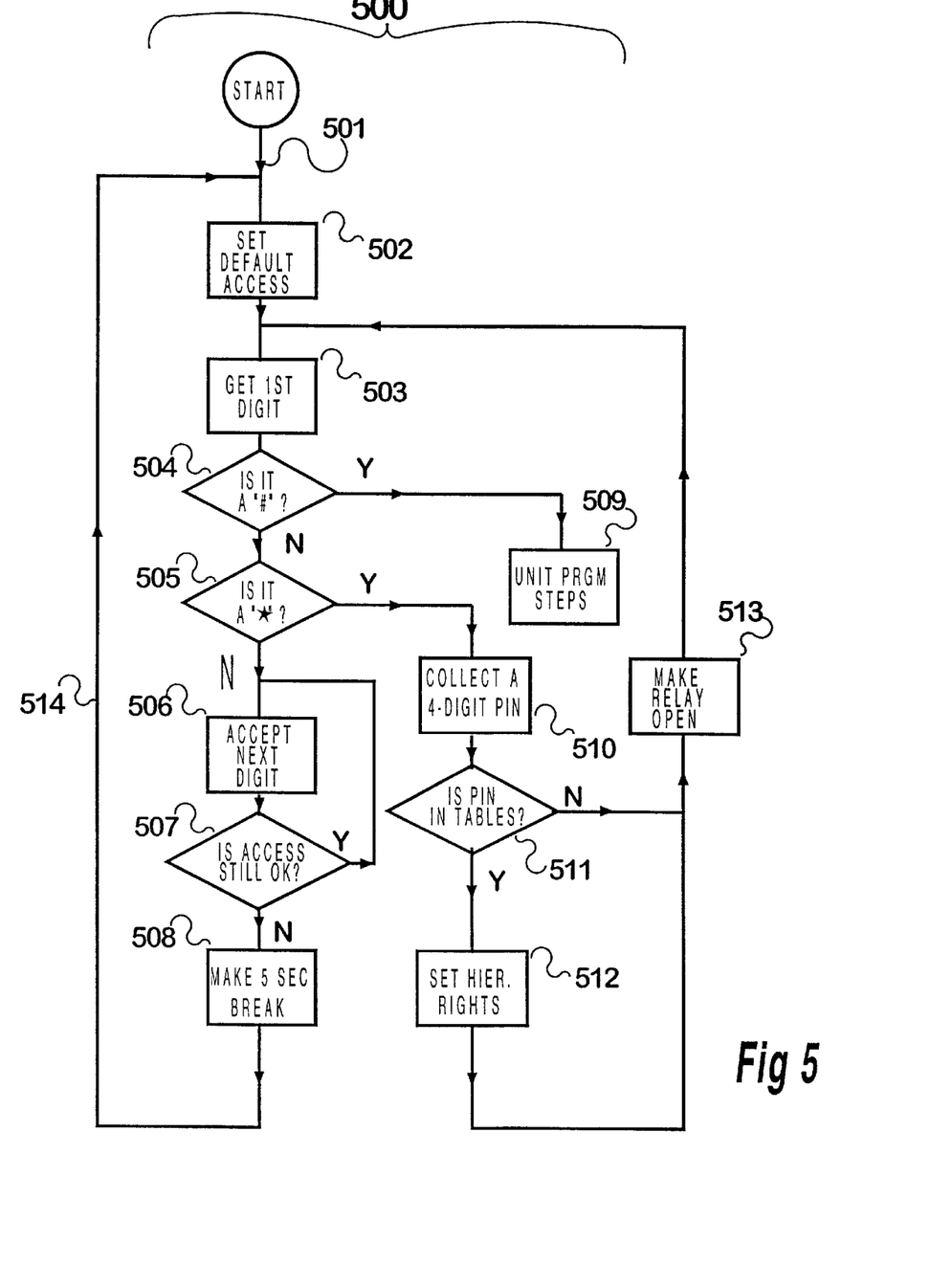
FIG. 5 shows a block diagram of the program resident within the microprocessor (CPU)

Refer to FIG. 5 and subsequent discussion for a simple block diagram of the recognition routine. Inside the device, there is means to decode the train of numbers (or characters) in a dialling sequence, and pass the first group of the sequence of numbers so decoded in front of an array of PINs preferably stored in a first non-volatile memory. This non-volatile memory may be a read-only memory (ROM), a programmable read-only memory (PROM), an electrically reprogrammable read-only memory (EPROM), or an electrically alterable read-only memory (EAROM or EEPROM). A flash memory is a kind of EEPROM; however this type tends to erase data in large blocks which requires greater resources to temporarily hold the data to be saved. If a match is found, the PIN sequence is removed from the dialling sequence so that it does not emanate from the apparatus of the invention and enter and thereby confuse the telephone network.

The passwords comprise personal identification numbers or PINs of preferably four digits although any number of digits can be used. Any PIN sequence may optionally begin with a number (or character, such as # or *) that is not normally used as the first in a dialling sequence, to serve as a signal that a PIN is being dialled.

If a PIN match is found, the next set of numbers, which will be the access code/area code portion of the sequence, is compared with the appropriate part of an allow/deny table stored in memory and linked so that that part is associated with the recognised PIN. There may be a number of PINs in memory though usually a number of these will normally be associated with each allow-deny table. If the set of numbers complies with an allowed set, the device does not take any disconnect action.

A matching PIN may not be found, for example if none was entered, a PIN was entered mistakenly, or a PIN which has been superseded and is now programmed out is entered. In such cases the process gives that call the lowest or least privilege—which may be local calls only or perhaps just the emergency services.

The invention allows selected numbers (if any) from within a field of denied numbers or number prefixes to be accessed. For example all 0900 numbers may be blocked except the one for weather forecasts, or all numbers in Wellington may be barred except for Grandma's phone. On the other hand all numbers in an area code may be permitted except a nominated one.

The invention can allow (in part or totally) only a specific range of numbers to be reached. Suppose a bank has branches across the country, reachable only by expensive trunk lines. It may be convenient to provide telephones to ordinarily reach all those branches but no other trunk or other expense-incurring lines; and a PIN may permit further access.

Each PIN will normally cover equivalent rights offered by different carriers—so that if the prefix "050" is dialled in order to select the carrier "Clear" the same coverage is subsequently applied by a given password. Therefore any one PIN may have several allow/deny tables linked to it.

If (a) there is no match found for the PIN, or if the number dialled is not permitted for that PIN, the device takes disconnect action. Preferably this is by emulating an "on-hook status" to the exchange, which is normally done by halting current drain on the line for approximately 500 mS. A practical method for this disconnect action is to cause a normally-closed relay contact, placed in series with the trunk line, to open momentarily.

The user of an ordinary telephone will hear a brief period of silence, followed by a dial tone, if the call was not permitted. A modem will typically cause a "DISCONNECTED" message to appear.

One or more individuals may also be provided with a further PIN, which allows the reprogramming of the device should its present state be found unsuitable at some future time. These further PINs permit a re-programming sequence to be undertaken in order to change the number of any selected stored PIN in the table of PINS, or to alter the rights associated with any one PIN.

The invention comprises a password-controlled selective mode access controller, one version of which is a toll blocking device. Other aspects include the control of access to computer gateways, inter-company telephone links, and the like. The ability to allow access to specific telephones -and not just to an entire local area sharing a common code is an advantage.

In any given situation there will be more than one valid password available at any given time. The existence of a range of passwords, each providing access to a different range of telephone services, is expected to be the normal situation. For example in a small business, the manager may have a password giving rights to any service. His (or her) secretary may have a different password having rights extending as far as national long-distance calls. The store-man may have a password giving rights to only local calls.

The software used in this embodiment is a combination of segments written in two dialects of FORTH, in assembler, and in C, and finally linked together as executable code compatible with the instruction set of the microprocessor selected for use. This combination simply reflects the availability at the time of prototyping of suitable microprocessors and the limited program memory space available. The central engine of this software is designed to work with a hash table of data, using multiple level prioritisation. This embodiment (being restricted by the space available in current integrated circuit devices) allows up to 251 PINs. A typical hunt inside a fully programmed table inspects 8 PINS before confirming the presence of an input PIN, and in the worst case inspects 16 PINs.

When any person makes a call, he or she enters the PIN first, then the called number. In the preferred embodiment a restricted or blocked number is signalled to the user by an immediate return to a dial tone, although a voice message or any other communication might be used instead. It is cheap and convenient to abort the call from within the box by means of a nominally one-second hangup action, as indicated by a block of FIG. 5. A modem, fax machine or the like can be programmed to send a PIN automatically, or by interaction from the keyboard.

Using a further PIN as a password, it is possible to re-program one or more of the PINs held by the machine. They are preferably held within an electrically alterable memory chip, the EEprom of FIG. 3. This device can hold a stored number indefinitely even in the absence of a supply current, yet can be reloaded simply by passing a "Write" command plus the data to be saved to the specific chip at its address on the "$I^2C$" line (SDA and SCL wires).

In the event of all PIN records being lost, this EEprom chip may be unplugged by a service person and replaced by one having known contents. Thus a separate EEprom may be preferable even if improved processors having internal non-volatile memory become available.

Figure 4:
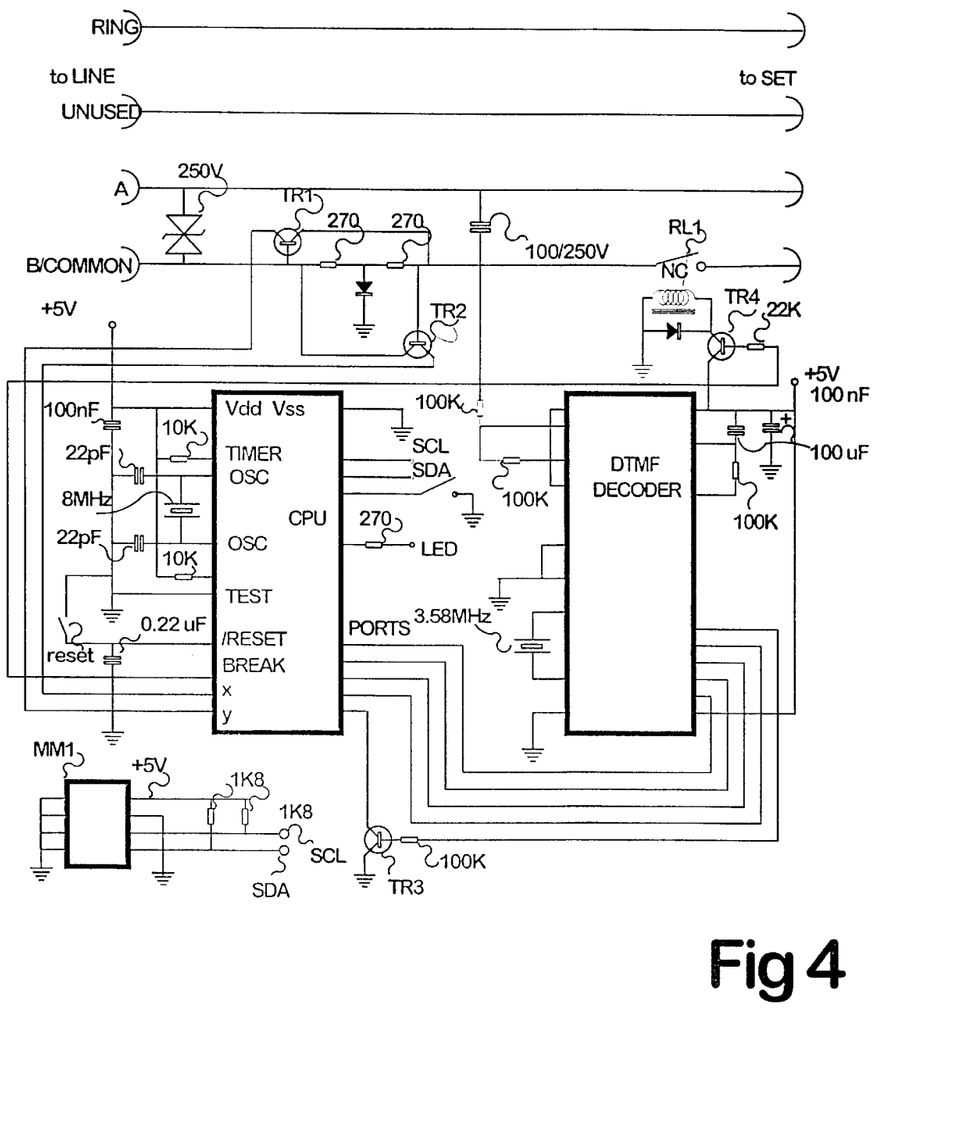
FIG. 4 shows an alternative circuit diagram for another preferred embodiment of the invention.

To consider operation of the device in more detail, we refer first to FIG. 1. The switch within the relay is a normally closed relay, to provide for fail-safe operation and to minimise power consumption. TR1 and TR2 of FIG. 4 provide means for detecting these states: off-hook, on-hook, ringing, pulse-dialling, and line reverse. The purpose of the relay switch—as in FIG. 1—is to provide by its opening for a short period a means of terminating a call recognised by the microprocessor when executing code as one which has been programmed to be denied or blocked when the current PIN (if any) is in operation. A standard convention of telephone circuitry is that the terminating device must draw some current from the exchange supply in order to maintain the connection.

Optional improvements that may be made to this circuit include:

Recording of PIN usage and call statistics. A suitable computer interface may be provided as an option for this purpose, so that the stored data can be read out from time to time as (for example) RS232 formatted serial data.

With the addition of means to generate and transmit DTMF tones, the unit itself may be used to automatically dial prefixes or entire telephone numbers, acting as an auto-dialler.

Minimum-Barring Mode

Operation would normally follow these steps:
1. Telephone taken off-hook.
2. Dialling begins.
3. Call-blocker accepts dialled number
4. CPU waits for on-hook status to return.

This version applies where the call is viewed as one not requiring a PIN—where access is not to be barred to anybody.

Barring Mode

Operation would normally follow these steps:
1. Telephone taken off-hook.
2. Dialling begins.
3. Call-blocker accepts PIN section of the dialled number and determines the level of restriction associated with that number. Generally entry of the PIN section is preceded by pressing the star (*) symbol on the keypad. Optionally the hash (#) symbol may be used.
4. Either the subsequent numbers are permitted under the coverage of the particular PIN received, in which case the relay is not energized into an open-switch state, or they are not, in which case the relay is energised so that the call is interrupted.
5. CPU waits for on-hook status to return.

FIG. 5 shows the controlling program 500 in its usual, supervisory mode as a block diagram. Program operation is initiated by the telephone (or like device) entering an off-hook state and pulling the line voltage low, whereupon this flow chart is entered at 501; the "START" point.

Program control passes through box 502 (set default access), then box 503 (get first digit) then decision box 504 (is the digit a "#" character?). If the character is a "#" program control passes to box 509 which contains many steps for programming the unit, and that box is further explained in the text below. That section of the program is terminated by returning the telephone to an on-hook state.

Decision box 505 (is the digit a "*" character?) acts as a switch to (if true) enter the test-for-a-PIN portion of the flow chart. Implicit in the program is the notion that the 4 digits following a "*" character are diverted down this branch. Box 510 is a portion of the program that collects a 4-digit PIN. Decision box 511 tests whether the PIN exists in the tables; if not, box 513 causes the series relay to open for (typically) 1.5 seconds in order to clear the line. If the PIN exists, then, at box 512, program control sets those (usually hierarchical) access rights which are found to be linked to the PIN and these rights (or the lack of them) will affect further operations in the 506–507–508 branch of the program. Box 513 may be entered at the completion of the call or program execution may be reset.

After the PIN sequence has been entered—if one was entered at all—program control passes to box 506, to accept the next digit decoded from the dialled sequence of signals, and decision box 507 comprises a test to determine if continued access for the number being built up is permitted. (This is the point at which the rights linked to the already-entered PIN (if any) are compared to those linked to the number being dialled). If continued access is not permitted, box 508 comprises a nominally 5 second break to clear the line and program control returns to the state of setting default access. If continued access is permitted, the user will stop entering digits and start using the telephone conventionally, and the program will "stall" between boxes 506 and 507 until such time as the telephone reverts to an "on-hook" state and the program resets itself.

Examples of programming the device, and altering the line access controlling arrangement follow.

EXAMPLE 1

Programming the unit to possess a set of 7 different sets of allowed/disallowed numbers. (This is the default set existing in the device as supplied). In the examples spaces have been inserted for clarity; as a telephone dial does not transmit spaces these spaces have no function.

Assuming 4321 is a master PIN, a person in possession of the master PIN can set up the invention with a sequence such as this:

(a) #4321
(b) *1 * 111# 0800# 0508#
(c) *2 # 0* 018#
(d) *3 * 0# 00* 0900* 010* 0501*
(e) *4 * 00# 0501#
(f) *5 * 0900# 010#
(g) *6 *
(h) #0000 * 1 #

The above corresponds to the initial startup of the unit. From the start:

(a) is the sequence to start programming the unit. It begins by taking the handset off-hook, dialling '#' to indicate programming, then a master PIN. Any PIN created with: #AAAA*007432156# can be used here (see later).

(b) programs the basic default set, '*1' indicates programming set 1. The next '*' indicates that the set disallows all calls. '111#' programs the set to allow 111 prefixed numbers. '0800#' programs the set to allow 0800 prefixed numbers, and '0508#' programs the set to allow 0508 prefixed numbers; i.e., set 1 disallows all numbers except 111 and numbers beginning with 0800 and 0508.

(c) '*2' initiates programming of set 2. '#' next indicates that all calls are allowed. '0*' programs the set to disallow 0 prefixed numbers, and '018#' programs the set to allow 018 prefixed numbers; i.e., all numbers are allowed by set 2 except numbers beginning with 0 but allowing 018.

(d) '*3' initiates programming of set 3. '*' means all numbers are disallowed. '0#' means numbers prefixed with 0 are allowed, '00*' disallows 00 prefixed numbers, '0900*' disallows 0900 prefixes, '010*' disallows 010 prefixes and '0501*' disallows 0501 prefixes; i.e., set 3 allows only numbers prefixed with 0 except 00, 0900, 010 and 0501 prefixes.

(e) '*4' initiates programming of set 4, '*' initialises the set to disallow all numbers. '00#' allows numbers prefixed with 00, and '0501#' allows numbers prefixed with 0501; i.e., set 4 only allows numbers prefixed with 00 and 0501.

(f) '*5' initiates programming of set 5. '*' initialises the set to disallow all numbers. '0900#' allows numbers prefixed with 0900, and '010#' allows numbers prefixed with 010; i.e., set 5 only allows numbers prefixed with 0900 and 010.

(g) '*6' initiates programming of set 6. '*' initialises the set to disallow all numbers; i.e., set 6 will pass no calls.

(h) '#0000' initiates programming of PIN 0000. '*' indicates access rights for that PIN follow. '1' means only numbers that pass through set 1 are allowed. '#' ends programming of PIN 0000. The PIN is written to the EEROM on the circuit board at this time.

The above is the default initialisation of the unit when it is first powered up, and does not have to be entered. It is given as an example of how the unit is programmed. While it may well satisfy many users in its present form, other sets may be freely programmed in a similar way.

EXAMPLE 2.

Changing the master PIN. Any number of sets and PINs in any order can be programmed with one entry of the master PIN sequence '#4321'. The master PIN can be changed at any time, assuming knowledge of it.

(a) #4321

(b) #4322 * 00432156 #

(c) #4321 * #

The above sequence changes the master PIN number from 4321 to 4322.

(a) '#4321' initiates unit programming. It is the current master PIN.

(b) #4321 creates a new PIN, 4321. '*' starts allocation of the PINs rights. '0' gives 4321 the right to create new PIN, but the created PINs cannot themselves create or spawn further new PINs. In contrast an '07' at this point gives 4321 the right to create PINs which themselves have the right to spawn further PINs. '432156' gives PIN 4321 access to sets 1 to 6 (i.e., all of them). '#' ends and records this PIN definition.

(c) #4321 recreates master PIN (current) 4321. '*' starts access definitions. '#' ends the (re)definition of 4321; i.e., it has no rights at all now, and is deleted from the PIN tables.

EXAMPLE 3.

Other possibilities exist. The user could for example decide that set 1 should only allow emergency access, and remove all possibility of tampering with this set. This could be done by:

(a) #4321

(b) *1 * 111# 911# 999#

(c) #4321 * 007 23456 #

This works by redefining set 1, then redefining the master PIN, in this case 4321 again, to disallow access to set 1. The device will always give access to set 1 when making a call, so it does not have to be explicitly given in PIN creation. As long as no other PINs have been created with option '07' set, then it is no longer possible to alter set 1. Creating a new master PIN will not help, since it can only have the same or a subset of the rights of the creating PIN, and the creating PIN (4321 or a child of it) no longer has access to set 1. This example is likely to be the factory default setting with the result that items listed under (b) above are permanently incorporated, (perhaps with 0800 and 0508 numbers) in New Zealand, and corresponding numbers in other countries.

Figure 3:
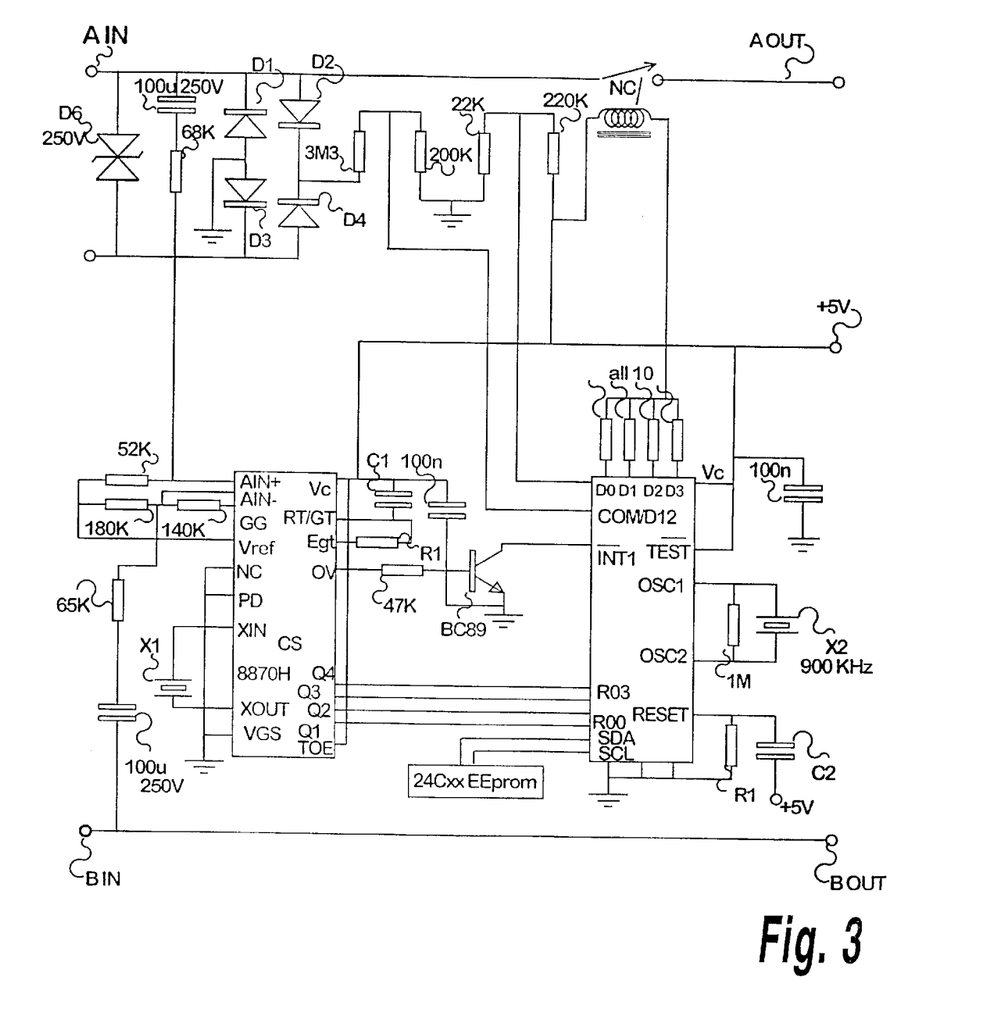
FIG. 3 shows a circuit diagram for one embodiment of the invention.

FIG. 3 shows a first actual circuit diagram for the invention. There is a 5-volt power supply (not shown) which may be a conventional three-terminal regulator fed from a bridge rectifier and a transformer as is well known in the art. Alternatively the invention could be powered from batteries, or from the telephone line voltage.

At the top left is shown the usual 250 V rated surge arrestor D6, and a bridge arrangement of diodes D1..D4 to rectify the line voltage for sampling by the CPU (through the resistor chain of 3.3 Megohms, 200K ohms, to CPU input COM/D12 and thereby determine the on-hook status.

The pair of 100 uF, 250 V capacitors and 68K resistors wired between A IN to AIN+ and B IN to AIN− sample the alternating component of voltages on the telephone line. Dual-tone, multi frequency (DTMF) sounds as caused by pressing a telephone keypad are received through this line, and fed through outputs Q1..Q4 of the decoder CS8870H to the CPU chip 4618.

A further connection is provided by the transistor BC859, wired to pull the CPU interrupt line low when the OV output of the decoder goes high.

The decoder CS 8870H has a crystal oscillator X1 operating at about 3.58 MHz. The CPU 4618 has a second crystal X2, operating at 800 KHz.

The relay is driven by four outputs D0,D1,D2 and D3 of the CPU chip, each having a ten ohm current-limiting resistor in series with it.

The EEprom has been described previously.

FIG. 4 shows a more recently developed and preferred embodiment. At the top of the figure run four wires which form the connection between this device and the telephone wiring. (In comparing this with FIG. 1, note that only two lines are actually connected to the device). In the lower part, a CPU chip, preferably a type ST62T20 (SGS/Thompson) (64 bytes RAM, 4 K bytes code space) is drawn, and a DTMF decoder chip, preferably type MT8870 is illustrated at lower right. An electrically erasable and reprogrammable memory chip, type 24C16, is shown at bottom left as device MM1. It uses the I²C protocol for communications, via lines SCL (clock) and SDA (data) and pull up resistors (2.8 K) are provided for the I2C bus open-drain drivers.

Signals generated by the telephone dial mechanism are passed down the 100 uF capacitor and through two 100 K resistors to the DTMF decoder inputs. This chip simply asserts or deasserts various outputs in recognising a valid DTMF signal. The outputs are wired in parallel to ports PB0..PB3 of the CPU, configured as inputs. A further input is inverted by transistor TR3, which has a current limiting resistor (100 K) in its base lead.

The functions of the CPU chip are to interpret incoming DTMF combinations as being (a) valid PINs or not, and then whether any telephone number prefixes are to be allowed, or blocked. Further details of this action are provided elsewhere in this specification (see FIG. 5). Ultimately if a call is to be blocked the CPU chip raises the line labelled BREAK, causing the transistor by the normally closed relay RL1 to conduct current through the relay, causing it to open and thereby interrupting the telephone circuit.

These preferred embodiments are examples of many possible circuits capable of carrying out the required functions, yet their components—and particularly those of FIG. 4, are relatively optimised for the purpose. It has been found possible to include a relatively large number of possible combinations of PIN groups, number prefixes, and attributes in a small working area. The spirit of the invention will be retained within other circuits—such as those that may occur to readers of this specification—that are capable of carrying out similar functions.

Finally, it will be appreciated that various alterations and modifications may be made to the foregoing without departing from the scope of this invention as claimed in the following claims.

We claim:

1. An apparatus for restricting selected outgoing communications of one of voice and data originated by an originator over a communication line comprising:

means for storing a PIN list of personal identification numbers each having an associated privilege rating, means for storing a prefix list of telephone number prefixes, each having an associated privilege rating, means for monitoring outgoing dialing signals within a communication line representing at least one sequence of at least one code character;

means for sequentially decoding the dialing signals into sequences of code characters;

means for comparing a first part of each entire sequence of code characters of the decoded dialing signals with the PIN list, thereby establishing the privilege rating of the originator, means for comparing a second part of each entire sequence of code characters of the decoded dialing signals with the prefix list to establish whether the privilege rating of the originator will permit onwards transmission of the communication;

means for causing the communication to be interrupted if the privilege rating associated with the telephone prefix exceeds the privilege rating associated with the originator of the message;

wherein said apparatus is located in one of a telephone, between the telephone and a PABX local exchange, and between the PABX local exchange and a central exchange.

2. An apparatus as claimed in claim 1 comprising:

an input having at least two wires for connection to a telephone, an output having at least two wires for connection to a telephone exchange line, means for sensing a voltage across the two input wires, switch means in series between the input and the output capable of interrupting a call;

said means for causing the communication to be interrupted comprising a processor having an output connected to the switching means.

3. An apparatus as claimed in claim 2, wherein a non-volatile memory is one of connected to and a part of the processor and said memory comprises (a) said means for storing said PIN list, each having an associated privilege rating and (b) said means for storing said prefix list of telephone number prefixes each having an associated privilege rating.

4. An apparatus as claimed in claim 3 wherein means are provided for selectively restricting access to a telephone network, further comprising a means implemented in software that includes the steps of:

becoming activated on detection of an off-hook state and becoming reset on detection of an on-hook state, on activation initialising a default access state, then accepting decoded characters created from a dialling sequence, entering a programming mode if a first special character is detected, receiving, validating, and deriving an access state from a PIN if a second special character, denoting a PIN, is detected, receiving a series of decoded characters from the remainder of the dialling sequence, determining from the access state whether that series represents an allowed or a denied telephone number, and causing the line current to be interrupted if the telephone number is to be denied.

5. An apparatus as claimed in claim 4, wherein entry of certain personal identification numbers causes the apparatus to enter a programming mode for storing one of an at least partially altered set of personal identification numbers with associated access states, and an at least partially altered set of at least partial telephone numbers having associated access states.

6. An apparatus as claimed in claim 5 wherein means for collecting and storing information concerning the originator, destination, and duration about any outgoing communications, and means for making the information available in machine-readable form is provided.

7. The apparatus as claimed in claim 1, wherein said apparatus is located in the telephone.

8. The apparatus as claimed in claim 1, wherein said apparatus is located between the telephone and the PABX local exchange.

9. A terminal comprising an apparatus for restricting selected, outgoing communications, said apparatus including means for storing a PIN list of personal identification numbers, each having an associated privilege rating, means for storing a prefix list of telephone number prefixes, each having an associated privilege rating, means for monitoring outgoing dialing signals within a communication line representing at least one sequence of at least one code character;

means for sequentially decoding the dialing signals into sequences of code characters;

means for comparing a first part of each entire sequence of code characters of the decoded dialing signals to the PIN list, thereby establishing the privilege rating of an originator;

means for comparing a second part of each entire sequence of code characters of the decoded dialing signals with the prefix list to establish whether the privilege rating of the originator will permit onwards transmission of the communication;

means for causing the communication to be interrupted if the privilege rating associated with the telephone prefix exceeds the privilege rating associated with the originator;

means for collecting and storing information concerning the originator, destination, and duration about any outgoing communications;

means for making the information available in machine-readable form;

wherein said apparatus is located in one of said terminal and between said terminal and PABX local exchange.

10. The terminal as claimed in claim 9, wherein said apparatus is located in said terminal.

11. The terminal as claimed in claim 9, wherein said apparatus is located between said terminal and said PABX local exchange.

12. An installation including a plurality of one of telephones and terminals having terminal lines merging to at least one common outgoing exchange line, wherein an apparatus is installed in series with the at least one outgoing exchange line at an installation end thereof, said apparatus including:

means for storing a PIN list of personal identification numbers, each having an associated privilege rating, means for storing a prefix list of telephone number prefixes, each having an associated privilege rating, means for monitoring outgoing dialing signals within a communication line representing at least one sequence of at least one code character;

means for sequentially decoding the dialing signals into sequences of code characters;

means for comparing a first part of each entire sequence of code characters of the decoded dialing signals to the PIN list thereby establishing the privilege rating of the originator;

means for comparing a second part of each entire sequence of code characters of the decoded dialing signals with the prefix list of telephone prefixes to establish whether the privilege rating, of the originator will permit onwards transmission of the communication;

means for causing the communication to be interrupted if the privilege rating associated with the telephone prefix exceeds the privilege rating associated with the originator;

means for collecting and storing information concerning the originator, destination, and duration about any outgoing communications, and means for making the information available in machine-readable form.

13. An installation comprising a plurality of apparatuses connected in series with an outgoing telephone line at an installation end thereof, each apparatus providing a different set of acceptable PINs and one of permitted and denied telephone numbers, each of said apparatuses including:

means for storing a PIN list of personal identification numbers each having an associated privilege rating, means for storing a prefix list of telephone number prefixes, each having an associated privilege rating, means for monitoring outgoing dialing signals within a communication line representing at least one sequence of at least one code characters;

means for sequentially decoding the dialing signals into sequences of code characters;

means for comparing a first part of each entire sequence of code characters of the decoded dialing signals to the PIN list thereby establishing the privilege rating of the originator;

means for comparing a second part of each entire sequence of code characters of the decoded dialing signals to the prefix list of telephone prefixes to establish whether the privilege rating, of the originator will permit onwards transmission of the communication; and means for causing the communication to be interrupted if the privilege rating associated with the telephone prefix exceeds the privilege rating associated with the originator.

* * * * *